(12) United States Patent
Bigot-Astruc et al.

(10) Patent No.: US 8,798,424 B2
(45) Date of Patent: Aug. 5, 2014

(54) SINGLE-MODE OPTICAL FIBER

(75) Inventors: Marianne Bigot-Astruc, Marcoussis (FR); Pierre Sillard, Le Chesnay (FR)

(73) Assignee: Draka Comteq B.V., Amsterdam (NL)

( * ) Notice: Subject to any disclaimer, the term of this patent is extended or adjusted under 35 U.S.C. 154(b) by 225 days.

(21) Appl. No.: 13/491,953

(22) Filed: Jun. 8, 2012

(65) Prior Publication Data

US 2012/0315006 A1  Dec. 13, 2012

(30) Foreign Application Priority Data

Jun. 9, 2011  (EP) .................................... 11305726

(51) Int. Cl.
*G02B 6/036* (2006.01)
*G02B 6/02* (2006.01)

(52) U.S. Cl.
CPC ........ *G02B 6/03666* (2013.01); *G02B 6/03661* (2013.01); *G02B 6/03616* (2013.01); *G02B 6/03688* (2013.01)
USPC ............................ 385/127; 385/123; 385/126

(58) Field of Classification Search
CPC ........... G02B 6/03616; G02B 6/03661; G02B 6/03666; G02B 6/03688
See application file for complete search history.

(56) References Cited

U.S. PATENT DOCUMENTS

| | | | |
|---|---|---|---|
| RE30,635 E | 6/1981 | Kuppers et al. | |
| 4,314,833 A | 2/1982 | Kuppers | |
| 4,838,643 A | 6/1989 | Hodges et al. | |
| 5,044,724 A | 9/1991 | Glodis et al. | |
| 5,574,816 A | 11/1996 | Yang et al. | |
| 5,717,805 A | 2/1998 | Stulpin | |
| 5,761,362 A | 6/1998 | Yang et al. | |
| 5,911,023 A | 6/1999 | Risch et al. | |
| 5,982,968 A | 11/1999 | Stulpin | |
| 6,035,087 A | 3/2000 | Bonicel et al. | |
| 6,066,397 A | 5/2000 | Risch et al. | |
| 6,085,009 A | 7/2000 | Risch et al. | |
| 6,134,363 A | 10/2000 | Hinson et al. | |
| 6,169,837 B1 * | 1/2001 | Kato et al. ..................... | 385/127 |

(Continued)

FOREIGN PATENT DOCUMENTS

| | | |
|---|---|---|
| EP | 1921478 A1 | 5/2008 |
| EP | 2003476 A1 | 12/2008 |

(Continued)

OTHER PUBLICATIONS

European Search Report in counterpart European Application No. 11305726 dated Nov. 3, 2011, pp. 1-4.

*Primary Examiner* — Rhonda Peace
(74) *Attorney, Agent, or Firm* — Additon, Higgins, Pendelton & Ashe, P.A.

(57) ABSTRACT

A single-mode optical fiber includes a central core surrounded by an outer optical cladding. The optical fiber includes an inner depressed cladding, a ring, and an outer depressed cladding positioned between the central core and the outer optical cladding. The central core typically has a refractive-index difference ($Dn_1$) with the outer optical cladding of between about $-0.5\times10^{-3}$ and $0.5\times10^{-3}$. The ring typically has an inner radius ($r_{ring1}$) of between about 21 microns and 35 microns and a refractive-index difference with the outer optical cladding ($Dn_{ring}$) of between about $-0.5\times10^{-3}$ and $0.5\times10^{-3}$. The outer depressed cladding typically has a volume ($V_{out}$) of between about 15 $\mu m^2$ and 30 $\mu m^2$. The ratio of the volume of the central core over the width of the ring ($V_{core}/w_{ring}$) is typically between about 0.12 micron and 0.2 micron.

29 Claims, 2 Drawing Sheets

(56) References Cited

U.S. PATENT DOCUMENTS

| | | | |
|---|---|---|---|
| 6,175,677 B1 | 1/2001 | Yang et al. |
| 6,181,857 B1 | 1/2001 | Emeterio et al. |
| 6,210,802 B1 | 4/2001 | Risch et al. |
| 6,215,931 B1 | 4/2001 | Risch et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,493,491 B1 | 12/2002 | Shen et al. |
| 6,603,908 B2 | 8/2003 | Dallas et al. |
| 6,618,538 B2 | 9/2003 | Nechitailo et al. |
| 6,658,184 B2 | 12/2003 | Bourget et al. |
| 6,749,446 B2 | 6/2004 | Nechitailo |
| 6,819,847 B2 * | 11/2004 | Matsuo et al. | 385/123 |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,045,010 B2 | 5/2006 | Sturman, Jr. |
| 7,162,128 B2 | 1/2007 | Lovie et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,483,613 B2 | 1/2009 | Bigot-Astruc et al. |
| 7,515,795 B2 | 4/2009 | Overton et al. |
| 7,526,177 B2 | 4/2009 | Matthijsse et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,574,095 B2 | 8/2009 | Lock et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,665,902 B2 | 2/2010 | Griffioen et al. |
| 7,702,204 B2 | 4/2010 | Gonnet et al. |
| 7,724,998 B2 | 5/2010 | Parris et al. |
| 7,817,891 B2 | 10/2010 | Lavenne et al. |
| 7,889,960 B2 | 2/2011 | de Montmorillon et al. |
| 7,970,247 B2 | 6/2011 | Barker |
| 7,974,507 B2 | 7/2011 | Lovie et al. |
| 7,995,888 B2 | 8/2011 | Gholami et al. |
| 8,009,950 B2 | 8/2011 | Molin et al. |
| 8,031,997 B2 | 10/2011 | Overton |
| 8,041,167 B2 | 10/2011 | Overton |
| 8,041,168 B2 | 10/2011 | Overton |
| 8,041,172 B2 | 10/2011 | Sillard et al. |
| 8,055,111 B2 | 11/2011 | Sillard et al. |
| 8,081,853 B2 | 12/2011 | Overton |
| 8,145,025 B2 | 3/2012 | De Montmorillon et al. |
| 8,145,026 B2 | 3/2012 | Overton et al. |
| 8,165,439 B2 | 4/2012 | Overton |
| 8,195,018 B2 | 6/2012 | Overton et al. |
| 2003/0152347 A1 * | 8/2003 | Matsuo et al. | 385/123 |
| 2007/0003198 A1 | 1/2007 | Gibson et al. |
| 2008/0031582 A1 | 2/2008 | Gonnet et al. |
| 2008/0292262 A1 | 11/2008 | Overton et al. |
| 2009/0175583 A1 | 7/2009 | Overton |
| 2009/0214167 A1 | 8/2009 | Lookadoo et al. |
| 2009/0297107 A1 | 12/2009 | Tatat |
| 2010/0021170 A1 | 1/2010 | Lumineau et al. |
| 2010/0092135 A1 | 4/2010 | Barker et al. |
| 2010/0118388 A1 | 5/2010 | Pastouret et al. |
| 2010/0119202 A1 | 5/2010 | Overton |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |
| 2010/0189399 A1 | 7/2010 | Sillard et al. |
| 2010/0189400 A1 | 7/2010 | Sillard et al. |
| 2010/0202741 A1 | 8/2010 | Ryan et al. |
| 2010/0214649 A1 | 8/2010 | Burov et al. |
| 2010/0215328 A1 | 8/2010 | Tatat et al. |
| 2010/0310218 A1 | 12/2010 | Molin et al. |
| 2011/0026889 A1 | 2/2011 | Risch et al. |
| 2011/0058781 A1 | 3/2011 | Molin et al. |
| 2011/0064367 A1 | 3/2011 | Molin et al. |
| 2011/0064371 A1 | 3/2011 | Leatherman et al. |
| 2011/0069724 A1 | 3/2011 | Richard et al. |
| 2011/0069932 A1 | 3/2011 | Overton et al. |
| 2011/0085770 A1 | 4/2011 | Bigot-Astruc et al. |
| 2011/0091171 A1 | 4/2011 | Tatat et al. |
| 2011/0100062 A1 | 5/2011 | Vydra et al. |
| 2011/0116160 A1 | 5/2011 | Boivin et al. |
| 2011/0123161 A1 | 5/2011 | Molin et al. |
| 2011/0123162 A1 | 5/2011 | Molin et al. |
| 2011/0135262 A1 | 6/2011 | Molin et al. |
| 2011/0135263 A1 | 6/2011 | Molin et al. |
| 2011/0176782 A1 | 7/2011 | Parris |
| 2011/0188823 A1 | 8/2011 | Sillard et al. |
| 2011/0188826 A1 | 8/2011 | Sillard et al. |
| 2011/0217012 A1 | 9/2011 | Bigot-Astruc et al. |
| 2011/0229101 A1 | 9/2011 | De Montmorillon et al. |
| 2011/0268398 A1 | 11/2011 | Quinn et al. |
| 2011/0268400 A1 | 11/2011 | Lovie et al. |
| 2011/0287195 A1 | 11/2011 | Molin |
| 2012/0009358 A1 | 1/2012 | Gharbi et al. |
| 2012/0014652 A1 | 1/2012 | Parris |
| 2012/0040105 A1 | 2/2012 | Overton |
| 2012/0040184 A1 | 2/2012 | de Montmorillon et al. |
| 2012/0051703 A1 | 3/2012 | Bigot-Astruc et al. |
| 2012/0057833 A1 | 3/2012 | Tatat |
| 2012/0092651 A1 | 4/2012 | Molin et al. |
| 2012/0134376 A1 | 5/2012 | Burov et al. |
| 2012/0148206 A1 | 6/2012 | Boivin et al. |
| 2012/0195549 A1 | 8/2012 | Molin et al. |
| 2012/0195561 A1 | 8/2012 | Molin et al. |
| 2012/0213483 A1 | 8/2012 | Risch et al. |
| 2012/0224254 A1 | 9/2012 | Burov et al. |
| 2012/0243843 A1 | 9/2012 | Molin et al. |
| 2012/0251062 A1 | 10/2012 | Molin et al. |
| 2012/0275751 A1 | 11/2012 | Krabshuis et al. |
| 2012/0301093 A1 | 11/2012 | Sillard et al. |
| 2012/0315006 A1 * | 12/2012 | Bigot-Astruc et al. | 385/126 |

FOREIGN PATENT DOCUMENTS

| | | |
|---|---|---|
| EP | 2312350 A1 | 4/2011 |
| EP | 2533082 A1 | 12/2012 |
| WO | 2009/062131 A1 | 5/2009 |
| WO | 2010/003856 A1 | 1/2010 |

* cited by examiner

US 8,798,424 B2

SINGLE-MODE OPTICAL FIBER

CROSS-REFERENCE TO PRIORITY APPLICATION

This application hereby claims the benefit of pending European Application No. 11305726.9 (filed Jun. 9, 2011, at the European Patent Office), which is hereby incorporated by reference in its entirety.

FIELD OF THE INVENTION

The present invention relates to the field of optical-fiber transmissions and, more specifically, single-mode optical fibers (SMF). The invention embraces a single-mode optical fiber having reduced attenuation, which can be manufactured from an increased-capacity optical preform.

BACKGROUND

An optical fiber's refractive-index profile is generally described as a relationship between refractive index and optical-fiber radius. Conventionally, the distance r to the center of the optical fiber is shown on the x-axis, and the difference between the refractive index (at radius r) and the refractive index of the optical fiber's outer cladding (e.g., an outer optical cladding) is shown on the y-axis. The outer cladding, functioning as an optical cladding, typically has a refractive index that is substantially constant. This outer cladding is typically made of pure silica but may also contain one or more dopants.

The refractive-index profile may have a "step" profile, a "trapezoidal" profile, a "parabolic" profile (e.g., an "alpha" profile), or a "triangular" profile, which can be graphically depicted as a step, trapezoidal, parabolic, or triangular shape, respectively. These curves are generally representative of the theoretical or design profile of the optical fiber. Constraints associated with optical-fiber fabrication may lead in practice to a profile that is perceptibly different.

An optical fiber conventionally includes an optical core, which has the function of transmitting and optionally amplifying an optical signal. A conventional optical fiber also typically includes an optical cladding, which confines the optical signal in the core. For this purpose, the refractive index of the core $n_c$ is typically greater than the refractive index of the cladding $n_g$ (i.e., $n_c > n_g$). As will be understood by those having ordinary skill in the art, the propagation of an optical signal in a single-mode optical fiber includes a fundamental mode, typically denoted LP01, which is guided in the core, and secondary modes, which are guided over a certain distance in the core and the optical cladding.

Single-mode optical fibers (SMFs) with a step-index profile are often used within optical-fiber transmission systems. Such optical fibers typically possess a chromatic dispersion and a chromatic-dispersion slope that comply with specific telecommunications standards.

Conventionally, so-called "standard" single-mode fibers (SSMFs) are used for land-based transmission systems. To facilitate compatibility between optical systems from different manufacturers, the International Telecommunication Union (ITU) has defined a standard reference ITU-T G.652 with which a standard optical transmission fiber (i.e., a standard single-mode fiber or SSMF) should comply. The ITU-T G.652 recommendations (11/2009) and each of its attributes (i.e., A, B, C, and D) are hereby incorporated by reference.

Among other recommendations for a transmission fiber, the ITU-T G.652 standard recommends (i) a mode field diameter (MFD) with a nominal value (e.g., a nominal mode field diameter) of between 8.6 microns (μm) and 9.5 microns and a tolerance of ±0.6 micron at a wavelength of 1310 nanometers (nm), (ii) a maximum cable cut-off wavelength ($\lambda_{CC}$) of 1260 nanometers (nm), (iii) a zero-dispersion wavelength (ZDW) of between 1300 nanometers and 1324 nanometers, and (iv) a maximum zero-dispersion slope (ZDS) of 0.092 picoseconds per square nanometer kilometer (ps/(nm²·km)) (i.e., the chromatic-dispersion slope at the zero-chromatic-dispersion wavelength is 0.092 ps/(nm²·km) or less).

The cable cut-off wavelength is conventionally measured as being the wavelength at which the optical signal is no longer single mode after propagating over 22 meters in the optical fiber, as defined by subcommittee 86A of the International Electrotechnical Commission (IEC) in standard IEC 60793-1-44. The IEC 60793-1-44 is hereby incorporated by reference in its entirety.

In most circumstances, the secondary mode that best withstands bending losses is the LP11 mode. The cable cut-off wavelength is thus the wavelength from which the LP11 mode is sufficiently attenuated after propagating for 22 meters in an optical fiber. The method proposed by the ITU-T G.652 standard considers that the optical signal is single mode as long as the attenuation of the LP11 mode is greater than or equal to 19.3 decibels (dB). According to the recommendations of IEC subcommittee 86A in standard IEC 60793-1-44, the cable cut-off wavelength is determined by imparting two loops having a radius of 40 millimeters (mm) in the optical fiber, while arranging the remainder of the optical fiber (i.e., 21.5 meters of optical fiber) on a mandrel having a radius of 140 millimeters.

The International Telecommunication Union (ITU) has defined a standard reference ITU-T G.654 with which a cut-off shifted single-mode optical fiber should comply.

The ITU-T G.654 recommendations (12/2006) and each of its attributes (i.e., A, B, and C) are hereby incorporated by reference. The ITU-T G.654.B standard recommends (i) a cable cut-off wavelength ($\lambda_{cc}$) of 1530 nanometers or less, (ii) a mode field diameter (MFD) with a nominal value (e.g., a nominal mode field diameter) of between 9.5 microns and 13.0 microns with a tolerance of ±0.7 micron at a wavelength of 1550 nanometers, (iii) chromatic dispersion (D) of less than 22 ps/(nm·km) at a wavelength of 1550 nanometers, (iv) a chromatic-dispersion slope (S) of less than 0.070 ps/(nm²·km) at a wavelength of 1550 nanometers, and (v) macrobending losses of less than 0.5 dB/100 turns around a bend radius of 30 millimeters at a wavelength of 1625 nanometers.

The ITU-T G.654.0 standard recommends (i) a cable cut-off wavelength ($\lambda_{cc}$) of 1530 nanometers or less, (ii) a mode field diameter (MDF) with a nominal value (e.g., a nominal mode field diameter) of between 9.5 microns and 10.5 microns with a tolerance of ±0.7 micron at a wavelength of 1550 nanometers, (iii) chromatic dispersion of less than 20 ps/(nm·km) at a wavelength of 1550 nanometers, (iv) a chromatic-dispersion slope of less than 0.070 ps/(nm²·km) at a wavelength of 1550 nanometers, and (v) macrobending losses of less than 0.5 dB/100 turns around a bend radius of 30 millimeters at a wavelength of 1625 nanometers.

Optical fibers can have pure-silica cores. The absence of dopant in the core of a Pure-Silica-Core Fiber (PSCF) makes it possible to limit optical losses and notably the attenuation at a wavelength of 1550 nanometers. A PSCF therefore typically has a cladding formed of silica doped with fluorine to reduce its refractive index and ensure that the optical signal is confined within the core.

Conventionally, an optical fiber is drawn from an optical-fiber preform in a fiber-drawing tower. The operation of drawing down an optical fiber to scale includes placing the optical-fiber preform vertically in a tower and drawing a strand of optical fiber from one end of the preform. For this purpose, a high temperature is applied locally to one end of the optical-fiber preform until the silica is softened, and then the speed of fiber-drawing and the temperature are continuously regulated to control the diameter of the optical fiber. The optical-fiber preform must present the same ratio of core diameter to cladding diameter as is to be achieved in the optical fiber drawn therefrom.

An optical fiber may be fabricated from an optical-fiber preform that includes a primary preform constituted by a deposition tube of pure or doped silica in which layers of doped and/or pure silica are deposited in succession in order to form an inner cladding and a central core. Primary preforms of this nature are typically fabricated on a deposition bench. The primary preform is then overcladded (e.g., fitted with a sleeve) to increase its diameter and form an optical-fiber preform or final preform that is suitable for use in a fiber-drawing tower. In this context, the term "inner" cladding designates the cladding formed inside the deposition tube (e.g., a substrate tube) and the term "outer" cladding or "over-cladding" designates the cladding formed outside the deposition tube.

Deposition operations inside the deposition tube are typically chemical vapor depositions (CVD). A CVD deposition is performed by injecting mixtures of gas into a deposition tube and ionizing the mixtures. CVD-type depositions include modified chemical vapor deposition (MCVD), furnace chemical vapor deposition (FCVD), and plasma-enhanced chemical vapor deposition (PCVD). CVD techniques help to ensure that the OH— peak remains low and that attenuation at 1383 nanometers is therefore limited.

After layers corresponding to the core and the inner cladding have been deposited, the deposition tube (i.e., including the deposition layers) is converted into a solid rod by an operation referred to as "collapsing." This produces the primary preform that is constituted by a solid rod (i.e., a solid rod including the collapsed deposition tube, inner cladding layers, and core layers). The primary preform is then overcladded, generally with grains of natural silica for reasons of cost. Overcladding may be performed by plasma deposition in which grains of doped or pure natural silica are deposited by gravity, melted, and vitrified on the periphery of the primary preform via a plasma torch.

Other techniques also exist for fabricating an optical-fiber preform. In this regard, the primary preform may be formed by outside deposition techniques, such as outside vapor deposition (OVD) or vapor axial deposition (VAD). During outside deposition techniques, no substrate tube is used. Rather, doped and/or undoped silica layers are deposited by directing precursor gases and a torch onto a starting rod.

As noted, various layers of a silica preform may be doped. During doping (i.e., component deposition), dopants are added to silica in order to change its refractive index. Germanium (Ge) or phosphorus (P) is used to increase the refractive index of silica. Germanium or phosphorus is often used for doping the central core of conventional optical fibers. Fluorine (F) or boron (B) is used to decrease the refractive index of silica. Fluorine is often used for forming depressed claddings.

Making a primary preform with a large, highly depressed cladding is difficult. For example, although a high temperature is required for making silica glass, it is difficult to incorporate fluorine in silica heated above a certain temperature.

PCVD techniques can be efficiently used to produce a depressed cladding inside a deposition tube. U.S. Pat. No. RE 30,635 and U.S. Pat. No. 4,314,833, each of which is hereby incorporated by reference in its entirety, describe PCVD techniques that allow fluorine to be significantly incorporated into silica in order to form highly depressed claddings. These patents describe that a deposition tube, made of pure silica or fluorine-doped silica, is mounted in a glasswork tower. The tube is then rotated while a gas mixture of silica and dopants is injected into the tube. The tube crosses a microwave cavity in which the gas mixture is heated locally. The microwave heating generates plasma by ionizing the gas mixture injected into the tube. The ionized dopants highly react with the silica particles, causing the deposition of doped silica layers inside the tube. The high reactivity of the dopants, generated by the microwave heating, enables a high concentration of dopants to be incorporated into the silica layers.

FIG. 1 illustrates a set refractive-index profile of a conventional PSCF. The depicted profile is a set profile that is representative of the optical fiber's theoretical profile. Constraints in the manufacture of the optical-fiber preform and the optical fiber, however, may result in a slightly different actual profile.

Those having ordinary skill in the art will recognize that the refractive indices of an optical fiber are equivalent to those of the optical-fiber preform from which the optical fiber is drawn. Furthermore, the radii of the core and cladding layers within an optical fiber are determined by the radii of the core and cladding layers within the optical-fiber preform from which the optical fiber is drawn. Thus, reference to an optical fiber's refractive-index profile can be readily extrapolated to the corresponding optical-fiber preform. That said, those having ordinary skill in the art will appreciate that the drawing process might cause an optical fiber's refractive index to deviate slightly from its corresponding optical-fiber preform.

The refractive-index profile of FIG. 1 depicts a central core having radius (a) and a refractive index, which corresponds to the refractive index of pure silica. The central core also has a refractive-index difference with the outer optical cladding ($Dn_1$). An inner depressed cladding having an outer radius ($r_{out}$) and a refractive-index difference with the outer optical cladding ($Dn_{inner}$) surrounds the central core. The inner cladding depicted in FIG. 1 is depressed, because it has a refractive index that is less than the refractive index of the outer optical cladding. The outer optical cladding is obtained by overcladding (e.g., by sleeving the primary preform). The outer cladding is generally formed of pure-silica glass and, therefore, has substantially the same refractive index as the central core in a PSCF. Typically, the outer cladding is formed from a substrate tube used to make the primary preform and/or from the overcladding used to reach the desired diameter ratio.

In the refractive-index profile depicted in FIG. 1, the fundamental mode LP01 is not completely guided and thus has additional losses, called leakage. To minimize these leakage losses, the percentage of energy propagating in the outer pure-silica cladding should be reduced. The ratio between the outer radius of the fluorine-doped inner cladding and the radius of the core ($r_{out}/a$) should therefore be sufficiently high. In other words, the inner depressed cladding should be extended at least as far as a critical radius whose value is dependent on the core radius and the refractive-index difference between the core refractive index $Dn_1$ and the refractive index of the inner cladding $Dn_{inner}$. For a standard SMF compliant with the ITU-T G.652 recommendations, it is thought that a ratio of eight or more between the outer radius of the inner depressed cladding and the radius of the core (i.e., $r_{out}/a > 8$) ensures good confinement of the optical signal in the central core and an acceptable level of leakage losses.

Commonly owned European Publication No. 2,312,350 and its counterpart U.S. Patent Publication No. 2011/0085770, each of which is hereby incorporated by reference in its entirety, disclose using a trench in the depressed cladding in order to limit the leakage losses of the LP01 mode. This design allows the substrate tube to be positioned closer to the central core. This solution, which is illustrated in FIG. 1 by the dotted lines, includes, within the depressed cladding, a trench having an inner radius (b), an outer radius (c), and a refractive index ($Dn_3$). The depressed cladding has a first portion adjacent to the core having an outer radius (b) and a refractive index ($Dn_2$) and a second portion adjacent to the substrate tube having an inner radius c and a refractive index ($Dn_{inner}$). This solution may be limited, however, because the substrate tube's inner radius ($r_{out}$) cannot be easily reduced below 30 microns without adversely affecting the resulting optical fiber's propagation characteristics.

MCVD, FCVD, and PCVD techniques are satisfactory to obtain a good quality central core and a large, highly depressed inner cladding. These techniques, however, are costly whenever large capacity preforms are sought. The capacity of an optical-fiber preform is defined as the length of optical fiber that can be drawn from that preform. The greater the diameter of the preform, the greater its capacity. To reduce manufacturing costs, it is desirable to provide long lengths of optical fiber from one optical-fiber preform. It is therefore desirable to fabricate large-diameter preforms while complying with dimensional constraints relating to the diameter of the central core and the diameter of the optical cladding. After overcladding, the final preform (i.e., the optical-fiber preform) must present the same ratio of core diameter to cladding diameter as is to be achieved in the optical fiber drawn therefrom.

U.S. Patent Application Publication No. 2008/0031582 and U.S. Pat. No. 5,044,724, each of which is hereby incorporated by reference in its entirety, disclose using a fluorine-doped deposition tube to make the primary preform. This solution helps to minimize the quantity of fluorine-doped layers deposited inside the tube. International Publication No. 2010/003856 and its counterpart U.S. Patent Publication No. 2011/0100062, each of which is hereby incorporated by reference in its entirety, disclose the fabrication of fluorine-doped tubes by POD (Plasma Outside Deposition) or OVD.

When a fluorine-doped deposition tube is used, the depressed cladding of the primary preform is composed of the inner deposited cladding and the deposition tube itself. The ratio between the outer radius of the depressed cladding and the radius of the core can thereby be increased while limiting the quantity of deposition inside the tube. This solution, however, is not practical for very thick tubes because the deposition conditions change when a fluorine-doped tube is used instead of a pure-silica tube, ultimately limiting the reduction of the quantity deposited inside the tube.

U.S. Patent Application Publication No. 2007/0003198, which is hereby incorporated by reference in its entirety, discloses a hybrid process in which a rod used to form a germanium-doped core region is made by VAD or OVD and a cladding region is deposited inside a tube by MCVD. The core rod and the MCVD cladding tube are then assembled using a rod-in-tube technique. The optical fibers disclosed in this publication, however, do not have pure-silica cores or depressed claddings. As a result, these fibers do not face the same issues faced by PSCFs, namely achieving low attenuations at both 1383 nanometers and 1550 nanometers.

European Publication No. 2,003,476, which is hereby incorporated by reference in its entirety, discloses ring-assisted profiles in which the refractive index of the ring is close to that of the central core. The ring is designed to resonantly couple its modes with the higher-order modes of the central core. This solution prevents the central-core higher-order modes from propagating, ultimately improving the bend losses of the fundamental mode. These profiles, however, are not designed for pure-silica core fibers.

SUMMARY

The present invention facilitates a reduction of the fluorine-doped inner depressed cladding that is deposited inside a substrate tube without increasing the leakage losses of the fundamental LP01 mode and without deteriorating the resulting optical fiber's other propagation characteristics.

In one aspect, the present invention embraces a single-mode optical fiber that includes a central core surrounded by an outer optical cladding (i.e., an outer cladding). The optical fiber includes at least an inner depressed cladding, a ring, and an outer depressed cladding respectively positioned between the central core and the outer optical cladding. The central core and the ring are typically formed of substantially pure silica.

The central core typically has a radius (a) of between about 3.5 microns and 7.5 microns and a refractive-index difference with the outer optical cladding ($Dn_1$) of between about $-0.5 \times 10^{-3}$ and $0.5 \times 10^{-3}$.

The inner depressed cladding typically has an outer radius ($r_{ring1}$) and a refractive-index difference with the outer optical cladding ($Dn_{inner}$) of between about $-6 \times 10^{-3}$ and $-2.7 \times 10^{-3}$.

The ring typically has an inner radius ($r_{ring1}$) of between about 21 microns and 35 microns, more typically between about 24 microns and 35 microns, an outer radius ($r_{ring2}$) and a refractive-index difference with the outer optical cladding ($Dn_{ring}$) of between about $-0.5 \times 10^{-3}$ and $0.5 \times 10^{-3}$.

The outer depressed cladding typically has an outer radius ($r_{out}$), a refractive-index difference with the outer optical cladding ($Dn_{out}$) of between about $-6 \times 10^{-3}$ and $-2 \times 10^{-3}$, a refractive-index difference with the inner depressed cladding ($Dn_{inner}$-$Dn_{out}$) of between about $-2 \times 10^{-3}$ and $2 \times 10^{-3}$, and a volume ($V_{out}$) of between about 15 μm² and 30 μm² (e.g., between about 17 μm² and 25 μm²).

The ratio of the volume of the central core to the width of the ring ($V_{core} \div w_{ring}$) is typically between about 0.12 micron and 0.2 micron. The ratio of the inner radius of the ring to the radius of the central core ($r_{ring1} \div a$) is typically between about 2.5 and 8.

In one embodiment, the optical fiber includes a trench positioned within the inner depressed cladding. The trench has an inner radius (b), an outer radius (c), and a refractive-index difference with the outer optical cladding ($Dn_3$).

Single-mode optical fibers in accordance with the present invention typically have leakage losses of less than about 0.005 dB/km at a wavelength of 1550 nanometers, a cable cut-off wavelength of less than 1550 nanometers, more typically 1530 nanometers or less (e.g., 1260 nanometers or less), at a wavelength of 1550 nanometers, macrobending losses of less than about 5 dB/m around a bend radius ($R_c$) of 10 millimeters, and, at a wavelength of 1625 nanometers, macrobending losses of less than about 10 dB/m around a bend radius ($R_c$) of 10 millimeters.

In another aspect, the present invention embraces a method for manufacturing an optical-fiber preform and, optionally, a single-mode optical fiber.

The method for manufacturing an optical-fiber preform typically includes the steps of (i) depositing layers inside a deposition tube to form a central core and an inner depressed cladding, the deposition tube forming a ring, (ii) providing a second depressed cladding, and (iii) providing an outer optical cladding, thereby forming the optical preform. In one embodiment, the deposition tube may be partially removed. Collapsing typically occurs after the central core and inner depressed cladding have been deposited inside the deposition tube. The second depressed cladding may be made by overcladding with doped silica (e.g., by sleeving with a doped tube or by outside deposition with doped silica). After the final optical preform has been formed, a single-mode optical fiber may be drawn (e.g., by heating an end of the preform).

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces single-mode optical fibers that have low transmission losses and that can be cost-effectively manufactured without deteriorating the optical-fiber propagation characteristics.

In one aspect, the present invention embraces an optical fiber having a pure silica core or a slightly doped silica core. The present optical-fiber designs help to limit attenuation, particularly attenuation at 1550 nanometers, that can occur when the central core is doped with germanium. The core and an inner depressed cladding can be formed by Chemical Vapor Deposition (CVD) inside a deposition tube (e.g., a glass substrate tube). The deposition tube itself forms a ring. This limits attenuation, notably attenuation at 1383 nanometers caused by the OH— peak.

Typically, the deposited central core, the deposited inner depressed cladding, and the deposition tube are collapsed. Subsequently, an outer depressed cladding is provided around the deposition tube. This design reduces the width of the depressed inner cladding that is deposited inside the deposition tube, thereby placing the deposition tube much closer to the central core. Accordingly, this technique yields larger capacity preforms and lowers manufacturing costs.

The ring helps to minimize the leakage losses of the fundamental LP01 mode (e.g., to less than 0.005 dB/km), while typically keeping the leakage losses of the higher-order LP11 mode sufficiently high to ensure a cable cut-off wavelength that complies with the ITU-T G.654 recommendations. The ring also facilitates reduced macrobending losses without sacrificing other propagation characteristics.

A single mode optical fiber in accordance with the present invention typically includes a central core surrounded by an outer optical cladding. An inner depressed cladding, ring, and outer depressed cladding, respectively, are typically positioned between the central core and the outer optical cladding.

Figure 2:
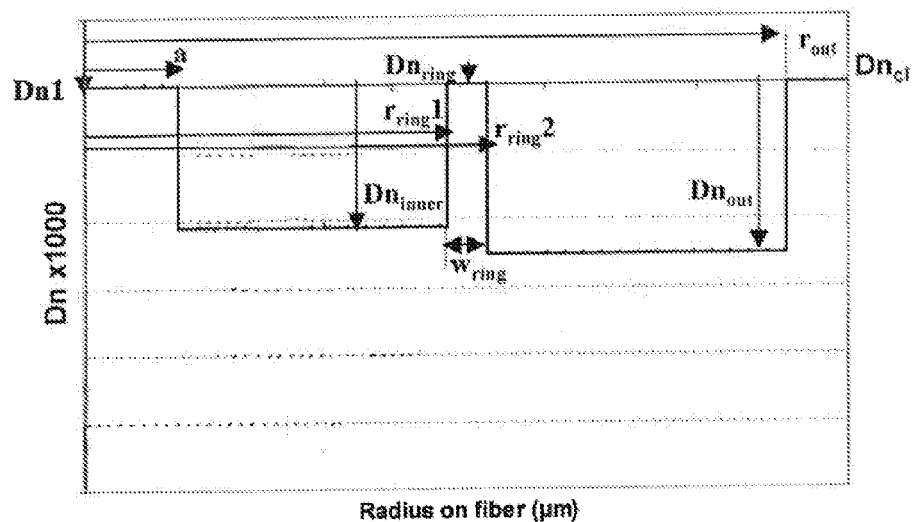
FIG. 2 schematically depicts a set refractive-index profile of an optical fiber according to an embodiment of the present invention.

In this regard, FIG. 2 depicts a set refractive-index profile of an exemplary single-mode optical fiber in accordance with the present invention.

The central core typically has a radius (a) of between about 3.5 microns and 7.5 microns and a refractive-index difference with the outer optical cladding ($Dn_1$) of between about $-0.5 \times 10^{-3}$ and $0.5 \times 10^{-3}$. The central core is typically made of undoped silica, slightly doped silica, or co-doped silica. The slight doping, if any, of the central core facilitates limited attenuation at 1550 nanometers. Moreover, the refractive index of the central core facilitates improved hydrogen resistance and reduced attenuation at 1383 nanometers caused by the OH— peak.

Figure 1:
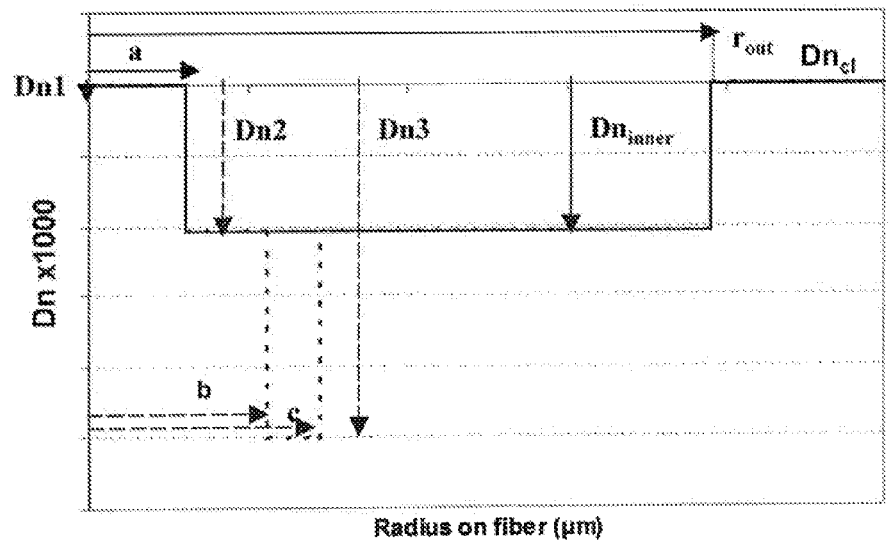
FIG. 1 schematically depicts a set refractive-index profile of a comparative pure-silica-core fiber.

The inner depressed cladding typically has an outer radius ($r_{ring1}$) of between about 21 microns and 35 microns, more typically between about 24 microns and 35 microns. The inner depressed cladding typically has a refractive-index difference with the outer optical cladding ($Dn_{inner}$) of between about $-6 \times 10^{-3}$ and $-2.7 \times 10^{-3}$. As compared with the depressed cladding's outer radius ($r_{out}$) depicted in FIG. 1, the inner depressed cladding's outer radius ($r_{ring1}$) in the present optical fibers facilitates limited deposition via CVD, thereby reducing manufacturing costs. Even so, the outer radius of the inner depressed cladding is not so small as to yield undesirable leakage losses. In this regard, the ratio of the inner depressed cladding's outer radius to the radius of the central core ($r_{ring1} \div a$) is typically between about 2.5 and 8, more typically between about 3.5 and 7. In contrast, for a conventional SMF this ratio typically exceeds 8 ($r_{out}/a > 8$) to ensure good optical-signal confinement in the central core and an acceptable level of leakage losses.

The ring has an inner radius ($r_{ring1}$) and an outer radius ($r_{ring2}$). The ring typically has a refractive-index difference with the outer optical cladding ($Dn_{ring}$) of between about $-0.5 \times 10^{-3}$ and $0.5 \times 10^{-3}$. The ring typically has a width ($w_{ring} = r_{ring2} - r_{ring1}$) of between about 1.5 microns and 5 microns, more typically between about 1.8 microns and 3 microns.

The outer depressed cladding has an inner radius ($r_{ring2}$) and an outer radius ($r_{out}$). The outer depressed cladding typically has a refractive-index difference with the outer optical cladding ($Dn_{out}$) of between about $-6 \times 10^{-3}$ and $-2 \times 10^{-3}$. The outer depressed cladding typically has a refractive-index difference with the inner depressed cladding ($Dn_{inner} - Dn_{out}$) of between about $-2 \times 10^{-3}$ and $2 \times 10^{-3}$. The outer depressed cladding typically has an outer radius ($r_{out}$) of between about 38 microns and 50 microns, more typically between about 45 microns and 48 microns.

The outer optical cladding can be pure, undoped silica or slightly doped silica, and its refractive-index value reflects its composition. The outer optical cladding typically has an outer radius of between about 61.5 microns and 63.5 microns.

Figure 3:
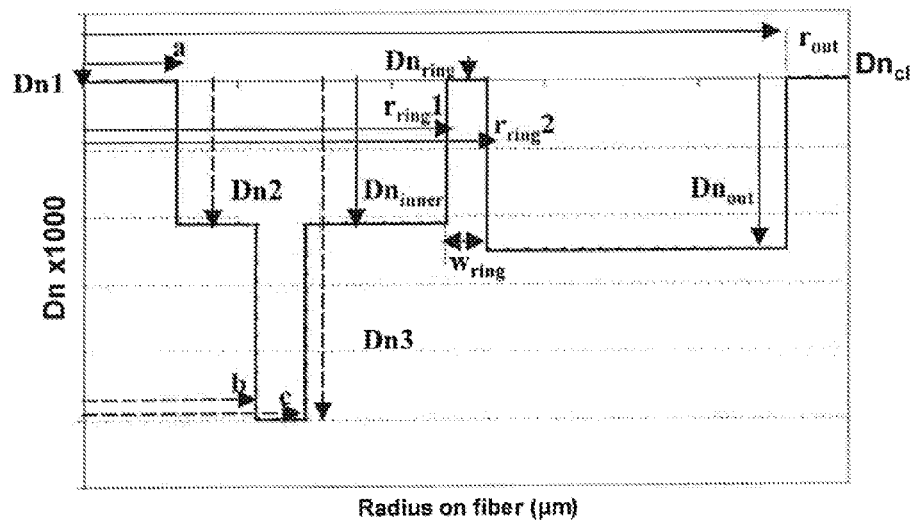
FIG. 3 schematically depicts a set refractive-index profile of an optical fiber according to another embodiment of the present invention.

In one embodiment depicted in FIG. 3, a trench may be positioned in the inner depressed inner cladding. The trench has an inner radius (b), an outer radius (c), and a refractive-index difference with the outer optical cladding ($Dn_3$). Typically, the trench's inner radius (b) is between about 7.5 microns and 12 microns (e.g., between about 10 microns and 12 microns). Typically, the trench's outer radius (c) is between about 13 microns and 21 microns (e.g., between about 13.5 microns and 15.5 microns). Typically, the trench's refractive-index difference with the outer optical cladding ($Dn_3$) is between about $-7 \times 10^{-3}$ and $-16 \times 10^{-3}$ (e.g., between about $-8 \times 10^{-3}$ and $-12 \times 10^{-3}$).

If a trench is present in the inner depressed inner cladding, the depressed inner cladding will have (i) a first portion adjacent to the central core with an outer radius (b) and a refractive index with the outer optical cladding ($Dn_2$) and (ii) a second portion adjacent to the ring with an inner radius (c) and a refractive-index difference with the outer optical cladding ($Dn_{inner}$). Typically, the refractive index of the first portion is substantially equal to the refractive index of the second portion. The trench helps to further limit the leakage losses of the LP01 mode.

The configuration of the ring facilitates low leakage losses, a low cut-off wavelength, and a small depressed inner cladding for a given mode field diameter. The configuration of the ring also helps to ensure that the present optical fibers comply with most of the requirements of the ITU-T G.652 recommendations and/or the ITU-T G.654 recommendations.

The ratio of the volume of the central core ($V_{core}$) over the width of the ring ($w_{ring} = r_{ring2} - r_{ring1}$) is typically between about 0.12 micron and 0.2 micron. In this regard, the volume ($V_{core}$) of the central core (i.e., volume integral) is defined as follows:

$$Vcore = 2\pi \left| \int_0^a Dn(r) r\, dr \right|$$

wherein,
$Dn(r) = n_{core}(r) - n_{inner}$;
$n_{core}(r)$ is the refractive index of the central core at the radius r; and
$n_{inner}$ is the average refractive index of the inner depressed cladding.

The configuration of the outer depressed cladding also facilitates low leakage losses, a low cut-off wavelength, and a small inner depressed cladding for a given mode field diameter. The configuration of the outer depressed cladding helps to ensure that the present optical fibers comply with most of the requirements of the ITU-T G.652 recommendations and/or the ITU-T G.654 recommendations.

The volume of the outer depressed cladding ($V_{out}$) is typically between about 15 μm² and 30 μm², more typically between about 17 μm² and 25 μm². The volume ($V_{out}$) of the outer depressed cladding (i.e., volume integral) is defined as follows:

$$Vout = 2\pi \left| \int_{rring2}^{rout} Dn(r) r\, dr \right|$$

wherein,
$Dn(r) = n_{out}(r) - n_{cl}$;
$n_{out}(r)$ is the refractive index of the outer depressed cladding at the radius r; and
$n_{cl}$ is the average refractive index of the outer optical cladding.

In combination, the volume of the outer depressed cladding ($V_{out}$) and the ratio of the volume of the central core to the width of the ring ($V_{core} \div w_{ring}$) help to ensure that optical-fiber propagation characteristics do not deteriorate. In particular, the present optical fibers typically have leakage losses of less than about 0.005 dB/km at a wavelength of 1550 nanometers, a cable cut-off wavelength ($\lambda_{cc}$) of less than about 1550 nanometers, and acceptable bending losses. The present optical fibers typically comply with the mode field diameter, chromatic dispersion, chromatic dispersion slope, and bending loss requirements of the ITU-T G.652 recommendations and/or the ITU-T G.654 recommendations. That said, the present optical fibers may have a cable cut-off wavelength ($\lambda_{cc}$) that exceeds the cable cut-off wavelength ($\lambda_{cc}$) specified in the ITU-T G.652 or the ITU-T G.654 recommendations.

Tables I-III provide prophetic, computer-modeling data with respect to comparative and exemplary optical fibers.

Tables I-II (below) depict seven exemplary optical-fiber profiles (Ex. 1-7). Tables I-II also depict eight comparative optical-fiber profiles (Comp. Ex. 1-8).

TABLE I

| Profiles | a (μm) | b (μm) | c (μm) | $r_{ring1}$ (μm) | $r_{ring2}$ (μm) | $r_{out}$ (μm) | $w_{ring}$ (μm) | $V_{core} \div w_{ring}$ (μm) | $V_{out}$ (μm²) |
|---|---|---|---|---|---|---|---|---|---|
| Ex. 1 | 4.4 | — | — | 26.1 | 27.9 | 47.8 | 1.8 | 0.17 | 23.7 |
| Ex. 2 | 4.4 | — | — | 29.0 | 31.0 | 47.2 | 2.0 | 0.15 | 19.9 |
| Comp. Ex. 1 | 4.4 | — | — | 25.1 | 26.9 | 46.8 | 1.8 | 0.17 | 46.0 |
| Comp. Ex. 2 | 4.4 | — | — | — | — | 43.5 | — | — | — |
| Ex. 3 | 6.1 | 11.2 | 14.4 | 25.1 | 28.1 | 45.8 | 3.0 | 0.16 | 20.6 |
| Ex. 4 | 6.1 | 11.2 | 14.4 | 23.7 | 26.3 | 45.8 | 2.6 | 0.19 | 22.2 |
| Comp. Ex. 3 | 6.1 | 11.2 | 14.4 | 27.3 | 34.3 | 48.6 | 7.0 | 0.07 | 18.6 |
| Comp. Ex. 4 | 6.1 | 11.2 | 14.4 | 27.3 | 33.3 | 45.1 | 6.0 | 0.08 | 14.5 |
| Comp. Ex. 5 | 6.1 | 11.2 | 14.4 | — | — | 39.1 | — | — | — |
| Ex. 5 | 5.3 | — | — | 30.4 | 32.7 | 46 | 2.3 | 0.18 | 15.6 |
| Comp. Ex. 6 | 5.3 | — | — | 24 | 25.9 | 46 | 1.9 | 0.42 | 21.6 |
| Comp. Ex. 7 | 5.3 | — | — | — | — | 42.5 | — | — | — |
| Comp. Ex. 8 | 4.4 | — | — | 19.0 | 21.0 | 47.2 | 2.0 | 0.15 | 28.1 |
| Ex. 6 | 4.4 | — | — | 29.0 | 31.0 | 47.2 | 2.0 | 0.15 | 19.9 |
| Ex. 7 | 5.3 | — | — | 30.4 | 32.7 | 46.0 | 2.3 | 0.18 | 17.3 |

TABLE II

| Profiles | $Dn_1$ ($10^{-3}$) | $Dn_2$ ($10^{-3}$) | $Dn_3$ ($10^{-3}$) | $Dn_{inner}$ ($10^{-3}$) | $Dn_{ring}$ ($10^{-3}$) | $Dn_{out}$ ($10^{-3}$) |
|---|---|---|---|---|---|---|
| Ex. 1 | 0.0 | — | — | −5.2 | 0.0 | −5.0 |
| Ex. 2 | 0.0 | — | — | −5.2 | 0.0 | −5.0 |
| Comp. Ex. 1 | 0.0 | — | — | −5.2 | 0.0 | −10.0 |
| Comp. Ex. 2 | 0.0 | — | — | −5.2 | — | — |
| Ex. 3 | 0.0 | −4.2 | −10.0 | −4.2 | 0.0 | −5.0 |
| Ex. 4 | 0.0 | −4.2 | −10.0 | −4.2 | 0.0 | −5.0 |
| Comp. Ex. 3 | 0.0 | −4.2 | −10.0 | −4.2 | 0.0 | −5.0 |
| Comp. Ex. 4 | 0.0 | −4.2 | −10.0 | −4.2 | 0.0 | −5.0 |

TABLE II-continued

| Profiles | $Dn_1$ $(10^{-3})$ | $Dn_2$ $(10^{-3})$ | $Dn_3$ $(10^{-3})$ | $Dn_{inner}$ $(10^{-3})$ | $Dn_{ring}$ $(10^{-3})$ | $Dn_{out}$ $(10^{-3})$ |
|---|---|---|---|---|---|---|
| Comp. Ex. 5 | 0.0 | −4.2 | −10.0 | −4.2 | — | — |
| Ex. 5 | 0.0 | — | — | −4.8 | 0.0 | −4.8 |
| Comp. Ex. 6 | 0.0 | — | — | −4.8 | 0.0 | −4.8 |
| Comp. Ex. 7 | 0.0 | — | — | −4.8 | — | — |
| Comp. Ex. 8 | 0.0 | — | — | −5.2 | 0.0 | −5.0 |
| Ex. 6 | 0.4 | — | — | −4.8 | 0.0 | −5.0 |
| Ex. 7 | −0.4 | — | — | −5.2 | 0.1 | −5.2 |

Table III (below) depicts optical characteristics of Examples 1-7 and Comparative Examples 1-8.

TABLE III

| | leakage | | | | | | Macrobending losses | |
|---|---|---|---|---|---|---|---|---|
| Profiles | $\lambda_{CC}$ (nm) | losses @1550 nm (dB/km) | D @1550 nm (ps/nm/km) | S @1550 nm (ps/nm²/km) | $A_{eff}$ @1550 nm (μm²) | MFD @1550 nm (μm) | (@1550 nm) (Rc = 10 mm) (dB/turn) | (@1625 nm) (Rc = 10 mm) (dB/turn) |
| Ex. 1 | 1203 | 0.000 | 16.4 | 0.054 | 82 | 10.3 | 3.0 | 7.9 |
| Ex. 2 | 1121 | 0.001 | 16.4 | 0.054 | 82 | 10.3 | 1.4 | 4.5 |
| Comp. Ex. 1 | >1600 | 0.000 | 16.6 | 0.055 | 82 | 10.3 | <0.001 | <0.001 |
| Comp. Ex. 2 | 1218 | 0.000 | 16.6 | 0.055 | 83 | 10.3 | 6.7 | 24.0 |
| Ex. 3 | 1458 | 0.000 | 21.0 | 0.062 | 120 | 12.1 | 0.1 | 0.4 |
| Ex. 4 | 1543 | 0.000 | 21.0 | 0.062 | 120 | 12.1 | 0.3 | 0.8 |
| Comp. Ex. 3 | >1600 | 0.002 | 21.0 | 0.062 | 120 | 12.1 | 0.9 | 1.7 |
| Comp. Ex. 4 | 1304 | 0.040 | 21.0 | 0.062 | 120 | 12.1 | 0.6 | 1.4 |
| Comp. Ex. 5 | 1502 | 0.002 | 21 | 0.062 | 120 | 12.1 | 0.6 | 1.4 |
| Ex. 5 | <1100 | 0.000 | 19.0 | 0.057 | 101 | 11.2 | 0.7 | 2.4 |
| Comp. Ex. 6 | 1252 | 0.000 | 19.0 | 0.057 | 101 | 11.2 | 6.2 | 12.1 |
| Comp. Ex. 7 | 1341 | 0.000 | 19.0 | 0.057 | 101 | 11.2 | 2.1 | 6.3 |
| Comp. Ex. 8 | 1435 | 0.001 | 16.3 | 0.053 | 82 | 10.3 | 45 | 94 |
| Ex. 6 | 1147 | 0.000 | 16.4 | 0.055 | 82 | 10.3 | 1.3 | 4.3 |
| Ex. 7 | <1100 | 0.000 | 19.1 | 0.056 | 100 | 11.2 | 0.9 | 2.6 |

As depicted in Table III, most of the optical fibers in accordance with the present invention are fully compliant with the ITU-T G.652 recommendations and/or the G.654 recommendations.

Notably, each of Examples 1-7, which are within the scope of the present invention, have (i) a chromatic dispersion below 22 ps/(nm·km) at a wavelength of 1550 nanometers, (ii) a dispersion slope of less than 0.070 ps/(nm²·km) at a wavelength of 1550 nanometers, (iii) an effective area ($A_{eff}$) of more than 70 μm², (iv) leakage losses of less than 0.005 dB/km, (v) at a wavelength of 1550 nanometers, macrobending losses of less than about 5 dB/m around a bend radius ($R_c$) of 10 millimeters, and (vi) at a wavelength of 1625 nanometers, macrobending losses of less than about 10 dB/m around a bend radius ($R_c$) of 10 millimeters.

Example 4 is within the scope of the present invention but has a cable cut-off wavelength that exceeds the requirements of the ITU-T G.652 and G.654 recommendations. In this regard, optical fibers in accordance with the present invention typically have a cable cut-off wavelength of less than 1550 nanometers. More typically, the present optical fibers have a cable cut-off wavelength of 1530 nanometers or less in compliance with the ITU-T G.654 recommendations. Even more typically, the present optical fibers have a cable cut-off wavelength of 1260 nanometers or less in compliance with the ITU-T G.652 recommendations.

As compared with Example 1, Comparative Example 1 has the same core dimensions, ring width, and outer depressed cladding width. That said, the ring in Comparative Example 1 is positioned closer to the central core. In addition, the outer depressed cladding in Comparative Example 1 has a lower refractive index, which helps to maintain low leakage losses and low bending losses despite the ring being closer to the central core. The leakage losses of the higher-order modes are strongly reduced, which contributes to an increase of the cable cut-off wavelength to greater than 1600 nanometers. The other propagation characteristics of Comparative Example 1 are relatively unchanged.

As compared with Example 1, Comparative Example 2 has the same central-core radius and refractive index and the same depressed-cladding refractive index. With the exception of much higher macrobending losses, the propagation characteristics of Comparative Example 2 are substantially similar to those of Example 1. The design of Comparative Example 2, however, requires a larger deposition region to form its depressed cladding, resulting in higher manufacturing costs.

As compared with Example 3, Comparative Example 3 has the same central-core radius and refractive index, the same inner-depressed-cladding refractive index, and the same trench width and refractive index. That said, Comparative Example 3 has different ring dimensions. The design of Comparative Example 3 results in a cable cut-off wavelength above 1600 nanometers.

As compared with Example 3, Comparative Example 4 has the same central-core radius and refractive index, the same inner-depressed-cladding refractive index, and the same trench width and refractive index. Comparative Example 4 has a wider ring and a lower outer-depressed-cladding volume. The wider ring and lower outer-depressed-cladding volume contribute to unacceptable leakage losses.

As compared with Example 3, Comparative Example 5 has the same central-core radius and refractive index, the same depressed-cladding refractive index, and the same trench width and refractive index, but Comparative Example 5 does not possess a ring. Comparative Example 5 has similar propagation characteristics to Example 3. That said, the design of Comparative Example 5 requires a larger deposition region to form its depressed cladding, thereby resulting in higher manufacturing costs.

As compared with Example 5, Comparative Example 6 has same refractive-index profile with the exception of its ring, which has a smaller width and is positioned closer to the central core. Comparative Example 6 has low leakage losses but increased macrobending losses.

As compared with Example 5, Comparative Example 7 has the same central-core radius and refractive index and the same depressed-cladding refractive index, but Comparative Example 7 does not possess a ring. Comparative Example 7 has a similar chromatic dispersion, chromatic dispersion slope, and mode field diameter to Example 5. Comparative Example 7, however, has higher macrobending losses and a higher cable cut-off wavelength. Moreover, the design of Comparative Example 7 requires a larger deposition region to form its depressed cladding, thereby resulting in higher manufacturing costs.

As compared with Example 2, Comparative Example 8 has a similar refractive-index profile. That said, the ring in Comparative Example 8 is positioned closer to the central core. As a consequence, Comparative Example 8 has low leakage losses but has high macrobending losses.

An optical preform in accordance with the present invention may be described by various ratios of cross-sectional areas. As will be understood by those having ordinary skill in the art, the following equations use R to refer to the outer radius of the respective optical-preform component.

The ratio of the cross-sectional area of the central core to the annular, cross-sectional area of the outer optical cladding is typically between about 0.0047 and 0.044, more typically between about 0.0061 and 0.039. In this regard, the ratio of the cross-sectional area of the central core to the cross-sectional area of the outer optical cladding is equal to:

$$\frac{R_{core}^2}{R_{outer\ optical\ cladding}^2 - R_{outer\ depressed\ cladding}^2}.$$

The ratio of the annular, cross-sectional area of the inner depressed cladding to the annular, cross-sectional area of the outer optical cladding is typically between about 0.14 and 0.95, more typically between about 0.25 and 0.83. In this regard, the ratio of the cross-sectional area of the inner depressed cladding to the cross-sectional area of the outer optical cladding is equal to:

$$\frac{R_{inner\ depressed\ cladding}^2 - R_{core}^2}{R_{outer\ optical\ cladding}^2 - R_{outer\ depressed\ cladding}^2}.$$

The ratio of the annular, cross-sectional area of the inner depressed cladding to the annular, cross-sectional area of the central core is typically between about 6 and 100. In this regard, the ratio of the cross-sectional area of the inner depressed cladding to the cross-sectional area of the central core is equal to:

$$\frac{R_{inner\ depressed\ cladding}^2 - R_{core}^2}{R_{core}^2}.$$

The ratio of the annular, cross-sectional area of the ring to the annular, cross-sectional area of the outer optical cladding is typically between about 0.025 and 0.28, more typically between about 0.044 and 0.15. In this regard, the ratio of the cross-sectional area of the ring to the cross-sectional area of the outer optical cladding is equal to:

$$\frac{R_{ring}^2 - R_{inner\ depressed\ cladding}^2}{R_{outer\ optical\ cladding}^2 - R_{outer\ depressed\ cladding}^2}.$$

The ratio of the annular, cross-sectional area of the ring to the annular, cross-sectional area of the central core is typically between about 1 and 30. In this regard, the ratio of the cross-sectional area of the ring to the cross-sectional area of the central core is equal to:

$$\frac{R_{ring}^2 - R_{inner\ depressed\ cladding}^2}{R_{core}^2}.$$

The ratio of the annular, cross-sectional area of the outer depressed cladding to the annular, cross-sectional area of the outer optical cladding is typically between about 0.30 and 1.56, more typically between about 0.39 and 1.11 (e.g., 0.45 to 0.90) In this regard, the ratio of the cross-sectional area of the second depressed cladding to the cross-sectional area of the outer optical cladding is equal to:

$$\frac{R_{outer\ depressed\ cladding}^2 - R_{ring}^2}{R_{outer\ optical\ cladding}^2 - R_{outer\ depressed\ cladding}^2}.$$

Figure 4:
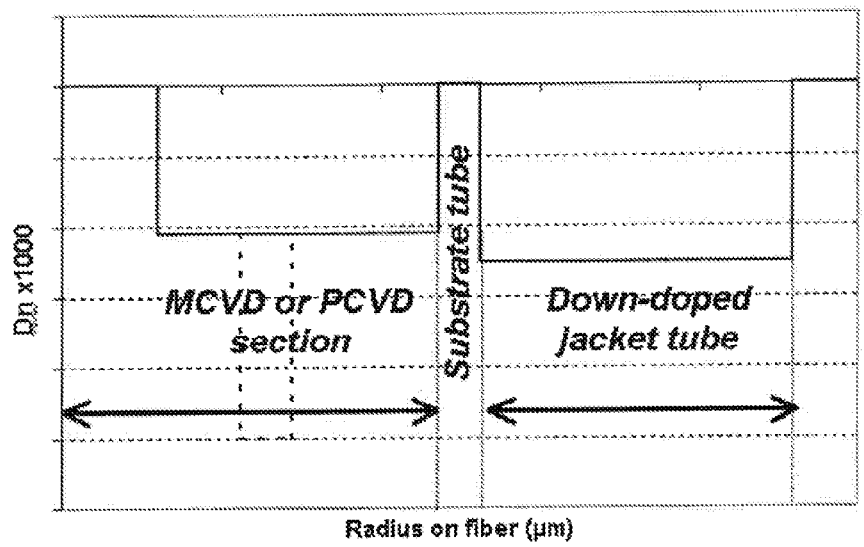
FIG. 4 illustrates a method of manufacturing an optical fiber in accordance with the present invention.

FIG. 4 illustrates a manufacturing method that can be used to obtain an optical preform and/or an optical fiber in accordance with the present invention at reduced manufacturing costs.

In one embodiment, the substrate tube (i.e., deposition tube) used in the deposition process can become the ring. In this regard, the central core, and the inner depressed cladding may be obtained by deposition inside the deposition tube. If a trench is present, the trench may also be obtained by deposition inside the deposition tube. Any chemical-vapor-deposition (CVD) technique may be used, such as plasma-enhanced chemical vapor deposition (PCVD), modified chemical vapor deposition (MCVD), or furnace chemical vapor deposition (FCVD). Accordingly, the outer radius of the chemical vapor deposition section is the inner radius of the ring ($r_{ring1}$). To ensure that the ring has the desired dimensions, the deposition tube may be partially removed by an evaporation or etching process.

The outer depressed cladding can be formed by overcladding the deposition tube (e.g., by sleeving with a down-doped jacket tube, such as a fluorine-doped tube, or by outside deposition with doped silica). A final preform is obtained by overcladding the outer depressed cladding with a silica-based material (e.g., sleeving with a quartz tube). Because the quantity of CVD is limited, the cost of forming the preform is reduced even while obtaining a large depressed region.

In contrast with optical fibers lacking a ring (e.g., Comparative Examples 2, 5, and 7), the present optical fibers facilitate a reduced down-doped inner cladding that is deposited inside the deposition tube (i.e., glass substrate tube), thereby placing the deposition tube closer to the central core. Accordingly, the present invention facilitates lower manufacturing costs.

In particular, the present method reduces the down-doped inner cladding that is deposited inside the deposition tube, which acts as the ring. In the resulting optical fiber, the radius of the down-doped inner cladding is reduced by about 10 microns as compared with an optical fiber having the same central core but lacking a ring.

In contrast with prior solutions in which a trench is added to a depressed cladding (e.g., as disclosed in European Publication No. 2,312,350), the present optical fibers facilitate a reduced radius of the deposited depressed cladding by more than 5 microns.

Moreover, in contrast with optical fibers without a ring, the present optical fibers have reduced macrobending losses, while keeping other propagation characteristics unchanged. Notably, the present optical fibers can have reduced macrobending losses without undesirably increasing the cable cut-off wavelength.

The present optical fibers may facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size.

Those having ordinary skill in the art will recognize that an optical fiber with a primary coating (and an optional secondary coating and/or ink layer) typically has an outer diameter of between about 235 microns and about 265 microns (μm). The component glass fiber itself (i.e., the glass core and surrounding cladding layers) typically has a diameter of about 125 microns, such that the total coating thickness is typically between about 55 microns and 70 microns.

With respect to the present optical fiber, the component glass fiber typically has an outer diameter of about 125 microns. With respect to the optical fiber's surrounding coating layers, the primary coating typically has an outer diameter of between about 175 microns and about 195 microns (i.e., a primary coating thickness of between about 25 microns and 35 microns), and the secondary coating typically has an outer diameter of between about 235 microns and about 265 microns (i.e., a secondary coating thickness of between about 20 microns and 45 microns). Optionally, the present optical fiber may include an outermost ink layer, which is typically between two and ten microns in thickness.

In one alternative embodiment, an optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

By way of illustration, in such exemplary embodiments, the primary coating layer may have an outer diameter of between about 135 microns and about 175 microns (e.g., about 160 microns), typically less than 165 microns (e.g., between about 135 microns and 150 microns), and usually more than 140 microns (e.g., between about 145 microns and 155 microns, such as about 150 microns).

Moreover, in such exemplary embodiments, the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns). By way of further illustration, an optical fiber may employ a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced thickness secondary coating of between 15 microns and 25 microns).

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

Reducing the diameter of the component glass fiber might make the resulting optical fiber more susceptible to microbending attenuation. That said, the advantages of further reducing optical-fiber diameter might be worthwhile for some optical-fiber applications.

As noted, the present optical fibers may include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

The present optical fibers may be deployed in various structures, such as those exemplary structures disclosed hereinafter.

For example, one or more of the present optical fibers may be enclosed within a buffer tube. For instance, optical fiber may be deployed in either a single-fiber loose buffer tube or a multi-fiber loose buffer tube. With respect to the latter, multiple optical fibers may be bundled or stranded within a buffer tube or other structure. In this regard, within a multi-fiber loose buffer tube, fiber sub-bundles may be separated with binders (e.g., each fiber sub-bundle is enveloped in a binder). Moreover, fan-out tubing may be installed at the termination of such loose buffer tubes to directly terminate loose buffered optical fibers with field-installed connectors.

In other embodiments, the buffer tube may tightly surround the outermost optical fiber coating (i.e., tight buffered fiber) or otherwise surround the outermost optical-fiber coating or ink layer to provide an exemplary radial clearance of between about 50 and 100 microns (i.e., a semi-tight buffered fiber).

With respect to the former tight buffered fiber, the buffering may be formed by coating the optical fiber with a curable composition (e.g., a UV-curable material) or a thermoplastic material. The outer diameter of tight buffer tubes, regardless of whether the buffer tube is formed from a curable or non-curable material, is typically less than about 1,000 microns (e.g., either about 500 microns or about 900 microns).

With respect to the latter semi-tight buffered fiber, a lubricant may be included between the optical fiber and the buffer tube (e.g., to provide a gliding layer).

As will be known by those having ordinary skill in the art, an exemplary buffer tube enclosing optical fibers as disclosed herein may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a buffer tube may be formed of one or more layers. The layers may be homogeneous or include mixtures or blends of various materials within each layer.

In this context, the buffer tube may be extruded (e.g., an extruded polymeric material) or pultruded (e.g., a pultruded, fiber-reinforced plastic). By way of example, the buffer tube may include a material to provide high temperature and chemical resistance (e.g., an aromatic material or polysulfone material).

Although buffer tubes typically have a circular cross section, buffer tubes alternatively may have an irregular or non-circular shape (e.g., an oval or a trapezoidal cross-section).

Alternatively, one or more of the present optical fibers may simply be surrounded by an outer protective sheath or encapsulated within a sealed metal tube. In either structure, no intermediate buffer tube is necessarily required.

Multiple optical fibers as disclosed herein may be sandwiched, encapsulated, and/or edge bonded to form an optical fiber ribbon. Optical fiber ribbons can be divisible into sub-units (e.g., a twelve-fiber ribbon that is splittable into six-fiber subunits). Moreover, a plurality of such optical fiber ribbons may be aggregated to form a ribbon stack, which can have various sizes and shapes.

For example, it is possible to form a rectangular ribbon stack or a ribbon stack in which the uppermost and lowermost optical fiber ribbons have fewer optical fibers than those toward the center of the stack. This construction may be useful to increase the density of optical elements (e.g., optical fibers) within the buffer tube and/or cable.

In general, it is desirable to increase the filling of transmission elements in buffer tubes or cables, subject to other constraints (e.g., cable or mid-span attenuation). The optical elements themselves may be designed for increased packing density. For example, the optical fiber may possess modified properties, such as improved refractive-index profile, core or cladding dimensions, or primary-coating thickness and/or modulus, to improve microbending and macrobending characteristics.

By way of example, a rectangular ribbon stack may be formed with or without a central twist (i.e., a "primary twist"). Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

As will be known to those having ordinary skill in the art, such optical fiber ribbons may be positioned within a buffer tube or other surrounding structure, such as a buffer-tube-free cable. Subject to certain restraints (e.g., attenuation), it is desirable to increase the density of elements such as optical fibers or optical fiber ribbons within buffer tubes and/or optical fiber cables.

A plurality of buffer tubes containing optical fibers (e.g., loose or ribbonized fibers) may be positioned externally adjacent to and stranded around a central strength member. This stranding can be accomplished helically in one direction, known as "S" or "Z" stranding, or via Reverse Oscillated Lay stranding, known as "S-Z" stranding. Stranding about the central strength member reduces optical fiber strain when cable strain occurs during installation and use.

Those having ordinary skill in the art will understand the benefit of minimizing fiber strain for both tensile cable strain and longitudinal compressive cable strain during installation or operating conditions.

With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers.

In a variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of buffer tubes containing optical fibers (e.g., loose or ribbonized fibers) may be simply placed externally adjacent to the central strength member (i.e., the buffer tubes are not intentionally stranded or arranged around the central strength member in a particular manner and run substantially parallel to the central strength member).

Alternatively still, the present optical fibers may be positioned within a central buffer tube (i.e., the central buffer tube cable has a central buffer tube rather than a central strength member). Such a central buffer tube cable may position strength members elsewhere. For instance, metallic or non-metallic (e.g., GRP) strength members may be positioned within the cable sheath itself, and/or one or more layers of high-strength yarns (e.g., aramid or non-aramid yarns) may be positioned parallel to or wrapped (e.g., contrahelically) around the central buffer tube (i.e., within the cable's interior space). As will be understood by those having ordinary skill in the art, such strength yarns provide tensile strength to fiber optic cables. Likewise, strength members can be included within the buffer tube's casing.

Strength yarns may be coated with a lubricant (e.g., fluoropolymers), which may reduce unwanted attenuation in fiber optic cables (e.g., rectangular, flat ribbon cables or round, loose tube cables) that are subjected to relatively tight bends (i.e., a low bend radius). Moreover, the presence of a lubricant on strength yarns (e.g., aramid strength yarns) may facilitate removal of the cable jacketing by reducing unwanted bonding between the strength yarns and the surrounding cable jacket.

In other embodiments, the optical fibers may be placed within a slotted core cable. In a slotted core cable, optical fibers, individually or as a fiber ribbon, may be placed within pre-shaped helical grooves (i.e., channels) on the surface of a central strength member, thereby forming a slotted core unit. The slotted core unit may be enclosed by a buffer tube. One or more of such slotted core units may be placed within a slotted core cable. For example, a plurality of slotted core units may be helically stranded around a central strength member.

Alternatively, the optical fibers may also be stranded in a maxitube cable design, whereby the optical fibers are stranded around themselves within a large multi-fiber loose buffer tube rather than around a central strength member. In other words, the large multi-fiber loose buffer tube is centrally positioned within the maxitube cable. For example, such maxitube cables may be deployed in optical ground wires (OPGW).

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may either tightly surround or loosely surround the stranded buffer tubes.

As will be known to those having ordinary skill in the art, additional elements may be included within a cable core. For example, copper cables or other active, transmission elements may be stranded or otherwise bundled within the cable sheath. Passive elements may also be placed within the cable core, such as between the interior walls of the buffer tubes and the enclosed optical fibers. Alternatively and by way of example, passive elements may be placed outside the buffer tubes between the respective exterior walls of the buffer tubes and the interior wall of the cable jacket, or within the interior space of a buffer-tube-free cable.

For example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube and/or cable jacketing (e.g., via adhesion, friction, and/or compression). Exemplary water-swellable elements are disclosed in commonly assigned U.S. Pat. No. 7,515,795 for a Water-Swellable Tape, Adhesive-Backed for Coupling When Used Inside a Buffer Tube, which is hereby incorporated by reference in its entirety.

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers within the buffer tube. Exemplary arrangements of such elements are disclosed in commonly assigned U.S. Pat. No. 7,599,589 for a Gel-Free Buffer Tube with Adhesively Coupled Optical Element, which is hereby incorporated by reference in its entirety.

The buffer tubes (or buffer-tube-free cables) may also contain a thixotropic composition (e.g., grease or grease-like gels) between the optical fibers and the interior walls of the buffer tubes. For example, filling the free space inside a buffer tube with water-blocking, petroleum-based filling grease helps to block the ingress of water. Further, the thixotropic filling grease mechanically (i.e., viscously) couples the optical fibers to the surrounding buffer tube.

Such thixotropic filling greases are relatively heavy and messy, thereby hindering connection and splicing operations. Thus, the present optical fibers may be deployed in dry cable structures (i.e., grease-free buffer tubes).

Exemplary buffer tube structures that are free from thixotropic filling greases are disclosed in commonly assigned U.S. Pat. No. 7,724,998 for a Coupling Composition for Optical Fiber Cables (Parris et al.), which is hereby incorporated by reference in its entirety. Such buffer tubes employ coupling compositions formed from a blend of high-molecular weight elastomeric polymers (e.g., about 35 weight percent or less) and oils (e.g., about 65 weight percent or more) that flow at low temperatures. Unlike thixotropic filling greases, the coupling composition (e.g., employed as a cohesive gel or foam) is typically dry and, therefore, less messy during splicing.

As will be understood by those having ordinary skill in the art, a cable enclosing optical fibers as disclosed herein may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape, along with one or more dielectric jackets, may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical fiber cable sheaths typically have a circular cross section, but cable sheaths alternatively may have an irregular or non-circular shape (e.g., an oval, trapezoidal, or flat cross-section).

By way of example, the present optical fiber may be incorporated into single-fiber drop cables, such as those employed for Multiple Dwelling Unit (MDU) applications. In such deployments, the cable jacketing must exhibit crush resistance, abrasion resistance, puncture resistance, thermal stability, and fire resistance as required by building codes. An exemplary material for such cable jackets is thermally stable, flame-retardant polyurethane (PUR), which mechanically protects the optical fibers yet is sufficiently flexible to facilitate easy MDU installations. Alternatively, a flame-retardant polyolefin or polyvinyl chloride sheath may be used.

In general, and as will be known to those having ordinary skill in the art, a strength member is typically in the form of a rod or braided/helically wound wires or fibers, though other configurations will be within the knowledge of those having ordinary skill in the art.

Optical fiber cables containing optical fibers as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical fiber cables may be installed within ducts, microducts, plenums, or risers. By way of example, an optical fiber cable may be installed in an existing duct or microduct by pulling or blowing (e.g., using compressed air). An exemplary cable installation method is disclosed in commonly assigned U.S. Pat. No. 7,574,095 for a Communication Cable Assembly and Installation Method, (Lock et al.), and U.S. Pat. No. 7,665,902 for a Modified Pre-Ferrulized Communication Cable Assembly and Installation Method, (Griffioen et al.), each of which is incorporated by reference in its entirety.

As noted, buffer tubes containing optical fibers (e.g., loose or ribbonized fibers) may be stranded (e.g., around a central strength member). In such configurations, an optical fiber cable's protective outer sheath may have a textured outer surface that periodically varies lengthwise along the cable in a manner that replicates the stranded shape of the underlying buffer tubes. The textured profile of the protective outer sheath can improve the blowing performance of the optical fiber cable. The textured surface reduces the contact surface between the cable and the duct or microduct and increases the friction between the blowing medium (e.g., air) and the cable. The protective outer sheath may be made of a low coefficient-of-friction material, which can facilitate blown installation. Moreover, the protective outer sheath can be provided with a lubricant to further facilitate blown installation.

In general, to achieve satisfactory long-distance blowing performance (e.g., between about 3,000 to 5,000 feet or more), the outer cable diameter of an optical fiber cable should be no more than about 70 to 80 percent of the duct's or microduct's inner diameter.

Compressed air may also be used to install optical fibers in an air blown fiber system. In an air blown fiber system, a network of unfilled cables or microducts is installed prior to the installation of optical fibers. Optical fibers may subsequently be blown into the installed cables as necessary to support the network's varying requirements.

Moreover, the optical fiber cables may be directly buried in the ground or, as an aerial cable, suspended from a pole or pylon. An aerial cable may be self-supporting, or secured or lashed to a support (e.g., messenger wire or another cable). Exemplary aerial fiber optic cables include overhead ground wires (OPGW), all-dielectric self-supporting cables (ADSS), all dielectric lash cables (AD-Lash), and figure-eight cables, each of which is well understood by those having ordinary skill in the art. Figure-eight cables and other designs can be directly buried or installed into ducts, and may optionally include a toning element, such as a metallic wire, so that they can be found with a metal detector.

In addition, although the optical fibers may be further protected by an outer cable sheath, the optical fiber itself may be further reinforced so that the optical fiber may be included within a breakout cable, which allows for the individual routing of individual optical fibers.

To effectively employ the present optical fibers in a transmission system, connections are required at various points in the network. Optical fiber connections are typically made by fusion splicing, mechanical splicing, or mechanical connectors.

The mating ends of connectors can be installed to the optical fiber ends either in the field (e.g., at the network location) or in a factory prior to installation into the network. The ends of the connectors are mated in the field in order to connect the optical fibers together or connect the optical fibers to the passive or active components. For example, certain optical fiber cable assemblies (e.g., furcation assemblies) can separate and convey individual optical fibers from a multiple optical fiber cable to connectors in a protective manner.

The deployment of such optical fiber cables may include supplemental equipment, which itself may employ the present optical fiber as previously disclosed. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

A cable containing the present optical fibers may be deployed for use in a communication system (e.g., networking or telecommunications). A communication system may include fiber optic cable architecture such as fiber-to-the-node (FTTN), fiber-to-the-telecommunications enclosure (FTTE), fiber-to-the-curb (FITC), fiber-to-the-building (FTTB), and fiber-to-the-home (FTTH), as well as long-haul or metro architecture. Moreover, an optical module or a storage box that includes a housing may receive a wound portion of the optical fiber disclosed herein. By way of example, the optical fiber may be wound around a bend radius of less than about 15 millimeters (e.g., 10 millimeters or less, such as about 5 millimeters) in the optical module or the storage box.

Moreover, present optical fibers may be used in other applications, including, without limitation, fiber optic sensors or illumination applications (e.g., lighting).

The present optical fibers may include Fiber Bragg Grating (FBG). As will be known by those having ordinary skill in the art, FBG is a periodic or aperiodic variation in the refractive index of an optical fiber core and/or cladding. This variation in the refractive index results in a range of wavelengths (e.g., a narrow range) being reflected rather than transmitted, with maximum reflectivity occurring at the Bragg wavelength.

Fiber Bragg Grating is commonly written into an optical fiber by exposing the optical fiber to an intense source of ultraviolet light (e.g., a UV laser). In this respect, UV photons may have enough energy to break molecular bonds within an optical fiber, which alters the structure of the optical fiber, thereby increasing the optical fiber's refractive index. Moreover, dopants (e.g., boron or germanium) and/or hydrogen loading can be employed to increase photosensitivity.

In order to expose a coated glass fiber to UV light for the creation of FBG, the coating may be removed. Alternatively, coatings that are transparent at the particular UV wavelengths (e.g., the UV wavelengths emitted by a UV laser to write FBG) may be employed to render coating removal unnecessary. In addition, silicone, polyimide, acrylate, or PFCB coatings, for instance, may be employed for high-temperature applications.

A particular FBG pattern may be created by employing (i) a photomask placed between the UV light source and the optical fiber, (ii) interference between multiple UV light beams, which interfere with each other in accordance with the desired FBG pattern (e.g., a uniform, chirped, or titled pattern), or (iii) a narrow UV light beam for creating individual variations. The FBG structure may have, for example, a uniform positive-only index change, a Gaussian-apodized index change, a raised-cosine-apodized index change, or a discrete phase-shift index change. Multiple FBG patterns may be combined on a single optical fiber.

Optical fibers having FBG may be employed in various sensing applications (e.g., for detecting vibration, temperature, pressure, moisture, or movement). In this respect, changes in the optical fiber (e.g., a change in temperature) result in a shift in the Bragg wavelength, which is measured by a sensor. FBG may be used to identify a particular optical fiber (e.g., if the optical fiber is broken into pieces).

Fiber Bragg Grating may also be used in various active or passive communication components (e.g., wavelength-selective filters, multiplexers, demultiplexers, Mach-Zehnder interferometers, distributed Bragg reflector lasers, pump/laser stabilizers, and supervisory channels).

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,526,177 for a Fluorine-Doped Optical Fiber (Matthijsse et al.); U.S. Pat. No. 7,555,186 for an Optical Fiber (Flammer et al.); U.S. Pat. No. 8,055,111 for a Dispersion-Shifted Optical Fiber (Sillard et al.); U.S. Pat. No. 8,041,172 for a Transmission Optical Fiber Having Large Effective Area (Sillard et al.); International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Pat. No. 8,145,025 for a Single-Mode Optical Fiber Having Reduced Bending Losses (de Montmorillon et al.); U.S. Pat. No. 7,889,960 for a Bend-Insensitive Single-Mode Optical Fiber, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Pat. No. 7,995,888 for a Multimode Optical Fibers, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for an Optical Fiber Amplifier Having Nanostructures, filed Feb. 19, 2010, (Burow et al.); U.S. Pat. No. 8,009,950 for a Multimode Fiber (Molin et al.); U.S. Patent Application Publication No. US2010/0310218 A1 for a Large Bandwidth Multimode Optical Fiber Having a Reduced Cladding Effect, filed Jun. 4, 2010, (Molin et al.); U.S. Patent Application Publication No. US2011/0058781 A1 for a Multimode Optical Fiber Having Improved Bending Losses, filed Sep. 9, 2010, (Molin et al.); U.S. Patent Application Publication No. US2011/0064367 A1 for a Multimode Optical Fiber, filed Sep. 17, 2010, (Molin et al.); U.S. Patent Application Publication No. US2011/0069724 A1 for an Optical Fiber for Sum-Frequency Generation, filed Sep. 22, 2010, (Richard et al.); U.S. Patent Application Publication No. US2011/0116160 A1 for a Rare-Earth-Doped Optical Fiber Having Small Numerical Aperture, filed Nov. 11, 2010, (Boivin et al.); U.S. Patent Application Publication No. US2011/0123161 A1 for a High-Bandwidth, Multimode Optical Fiber with Reduced Cladding Effect, filed Nov. 24, 2010, (Molin et al.); U.S. Patent Application Publication No. US2011/0123162 A1 for a High-Bandwidth, Dual-Trench-Assisted Multimode Optical Fiber, filed Nov. 24, 2010, (Molin et al.); U.S. Patent Application Publication No. US2011/0135262 A1 for a Multimode Optical Fiber with Low Bending Losses and Reduced Cladding Effect, filed Dec. 3, 2010, (Molin et al.); U.S. Patent Application Publication No. US2011/0135263 A1 for a High-Bandwidth Multimode Optical Fiber Having Reduced Bending Losses, filed Dec. 3, 2010, (Molin et al.); U.S. Patent Application Publication No. US2011/0188826 A1 for a Non-Zero Dispersion Shifted Optical Fiber Having a Large Effective Area, filed Jan. 31, 2011, (Sillard et al.); U.S. Patent Application Publication No. US2011/0188823 A1 for a Non-Zero Dispersion Shifted Optical Fiber Having a Short Cutoff Wavelength, filed Jan. 31, 2011, (Sillard et al.); U.S. Patent Application Publication No. 2011/0217012 A1 for a Broad-Bandwidth Multimode Optical Fiber Having Reduced Bending Losses, filed Mar. 1, 2011, (Bigot-Astruc et al.); U.S. Patent Application Publication No. 2011/0229101 A1 for a Single-Mode Optical Fiber, filed Mar. 15, 2011, (de Montmorillon et al.); U.S. Patent Application Publication No. 2012/0051703 A1 for a Single-Mode Optical Fiber, filed Jul. 1, 2011, (Bigot-Astruc et al.); U.S. Patent Application Publication No. 2012/0040184 A1 for a Method of Fabricating an Optical Fiber Preform, filed Aug. 10, 2011, (de Montmorillon et al.); U.S. Patent Application Publication No. 2012/0092651 A1 for a Multimode Optical Fiber Insensitive to Bending Losses, filed Oct. 18, 2011, (Molin et al.); U.S. Patent Application Publication No. 2012/0134376 A1 for a Radiation-Insensitive Optical Fiber Doped with Rare Earths, filed Nov. 23, 2011, (Burov et al.); U.S. patent application Ser. No. 13/315,712 for a Rare-Earth-Doped Optical Fiber, filed Dec. 9, 2011, (Boivin et al.); U.S. patent application Ser. No. 13/362,357 for a Broad-Bandwidth Optical Fiber, filed Jan. 31, 2012, (Molin et al.); U.S. patent application Ser. No. 13/362,395 for a Multimode Optical Fiber, filed Jan. 31, 2012, (Molin et al.); U.S. patent application Ser. No. 13/410,976 for a Rare-Earth-Doped Amplifying Optical Fiber, filed Mar. 2, 2012, (Burov et al.); U.S. patent application Ser. No. 13/428,520 for a Bend-Resistant Multimode Optical Fiber, filed Mar. 23, 2012, (Molin et al.); U.S. patent application Ser. No. 13/434,101 for a Multimode Optical Fiber, filed Mar. 29, 2012, (Molin et al.); U.S. patent application Ser. No. 13/456,562 for a High-Bandwidth, Radiation-Resistant Multimode Optical Fiber, filed Apr. 26, 2012, (Krabshuis et al.); and U.S. patent application Ser. No. 13/481,150 for a Single-Mode Optical Fiber, filed May 25, 2012, (Sillard et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Patent No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. Pat. No. 8,195,018 for a Buffer Tube with Adhesively Coupled Optical Fibers and/or Water-Swellable Element; U.S. Patent Application Publication No. US2010/0092135 A1 for an Optical Fiber Cable Assembly, filed Sep. 10, 2009, (Barker et al.); U.S. Pat. No. 7,974,507 A1 for a High-Fiber-Density Optical Fiber Cable (Louie et al.); U.S. Pat. No. 7,970,247 for a Buffer Tubes for Mid-Span Storage (Barker); U.S. Pat. No. 8,081,853 for Single-Fiber Drop Cables for MDU Deployments (Overton); U.S. Pat. No. 8,041,167 for an Optical-Fiber Loose Tube Cables (Overton); U.S. Pat. No. 8,145,026 for a Reduced-Size Flat Drop Cable (Overton et al.); U.S. Pat. No. 8,165,439 for ADSS Cables with High-Performance Optical Fiber (Overton); U.S. Pat. No. 8,041,168 for Reduced-Diameter Ribbon Cables with High-Performance Optical Fiber (Overton); U.S. Pat. No. 8,031,997 for a Reduced-Diameter, Easy-Access Loose Tube Cable (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. Patent Application Publication No. US2011/0026889 A1 for a Tight-Buffered Optical Fiber Unit Having Improved Accessibility, filed Jul. 26, 2010, (Risch et al.); U.S. Patent Application Publication No. US2011/0064371 A1 for Methods and Devices for Cable Insertion into Latched Conduit, filed Sep. 14, 2010, (Leatherman et al.); U.S. Patent Application Publication No. 2011/0069932 A1 for a High-Fiber-Density Optical-Fiber Cable, filed Oct. 19, 2010, (Overton et al.); U.S. Patent Application Publication No. 2011/0091171 A1 for an Optical-Fiber Cable Having High Fiber Count and High Fiber Density, filed Oct. 19, 2010, (Tatat et al.); U.S. Patent Application Publication No. 2011/0176782 A1 for a Water-Soluble Water-Blocking Element, filed Jan. 19, 2011, (Parris); U.S. Patent Application Publication No. 2011/0268400 A1 for a Data-Center Cable, filed Apr. 28, 2011, (Louie et al.); U.S. Patent Application Publication No. 2011/0268398 A1 for a Bundled Fiber Optic Cables, filed May 3, 2011, (Quinn et al.); U.S. Patent Application Publication No. 2011/0287195 A1 for a Curing Apparatus Employing Angled UVLEDs, filed May 19, 2011, (Molin); U.S. Patent Application Publication No. 2012/0009358 for a Curing Apparatus Having UV Sources That Emit Differing Ranges of UV Radiation, filed Jun. 3, 2011, (Gharbi et al.); U.S. Patent Application Publication No. 2012/0014652 A1 for a Adhesively Coupled Optical Fibers and Enclosing Tape, filed Jul. 13, 2011, (Parris); U.S. Patent Application Publication No. 2012/0040105 A1 for a Method and Apparatus Providing Increased UVLED Intensity, filed Aug. 10, 2011, (Overton); U.S. Patent Application Publication No. 2012/0057833 A1 for an Optical-Fiber Module Having Improved Accessibility, filed Aug. 31, 2011, (Tatat); U.S. patent application Ser. No. 13/401,026 for a Optical-Fiber Interconnect Cable, filed Feb. 21, 2012, (Risch et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A single-mode optical fiber, comprising:
a central core surrounded by an outer optical cladding, said central core having a radius (a) and a refractive-index difference ($Dn_1$) with said outer optical cladding of between about $-0.5 \times 10^{-3}$ and $0.5 \times 10^{-3}$;
an inner depressed cladding positioned between said central core and said outer optical cladding, said inner depressed cladding having an outer radius ($r_{ring1}$) and a refractive-index difference ($Dn_{inner}$) with said outer optical cladding;
a ring positioned between said inner depressed cladding and said outer optical cladding, said ring having an inner radius ($r_{ring1}$) of between about 21 microns and 35 microns, an outer radius ($r_{ring2}$), a width ($w_{ring}$), and a refractive-index difference ($Dn_{ring}$) with said outer optical cladding of between about $-0.5 \times 10^{-3}$ and $0.5 \times 10^{-3}$; and
an outer depressed cladding positioned between said ring and said outer optical cladding, said outer optical cladding having an outer radius ($r_{out}$) and a refractive-index difference ($Dn_{out}$) with said outer optical cladding;
wherein said central core has a volume ($V_{core}$), the ratio of said volume of said central core over said width of said ring ($V_{core}/w_{ring}$) being between about 0.12 micron and 0.2 micron, the volume ($V_{core}$) of said central core being defined as follows:

$$Vcore = 2\pi \left| \int_0^a Dn(r)r\,dr \right|$$

wherein,
$Dn(r) = n_{core}(r) - n_{inner}$;
$n_{core}(r)$ is the refractive index of the central core at the radius r; and
$n_{inner}$ is the average refractive index of the inner depressed cladding;
wherein said outer depressed cladding has a volume of between about 15 μm² and 30 μm², said volume ($V_{out}$) of said outer depressed cladding being defined as follows:

$$Vout = 2\pi \left| \int_{rring2}^{rout} Dn(r)r\,dr \right|$$

wherein,
$Dn(r) = n_{out}(r) - n_{cl}$;
$n_{out}(r)$ is the refractive index of the outer depressed cladding at the radius r; and
$n_{cl}$ is the average refractive index of the outer optical cladding.

2. The single-mode optical fiber according to claim 1, comprising a trench positioned within said inner depressed cladding, said trench having an inner radius (b), an outer radius (c), and a refractive-index difference ($Dn_3$) with said outer optical cladding, said outer radius (c) of said trench being less than said outer radius ($r_{ring1}$) of said inner depressed cladding.

3. The single-mode optical fiber according to claim 2, wherein said trench has an inner radius (b) of between about 7.5 microns and 12 microns, an outer radius (c) of between about 13 microns and 21 microns, and a refractive-index difference ($Dn_3$) with said outer optical cladding of between about $-16 \times 10^{-3}$ and $-7 \times 10^{-3}$.

4. The single-mode optical fiber according to claim 1, wherein said central core has a radius (a) of between about 3.5 microns and 7.5 microns.

5. The single-mode optical fiber according to claim 1, wherein said inner depressed cladding has a refractive-index difference ($Dn_{inner}$) with said outer optical cladding of between about $-6 \times 10^{-3}$ and $-2.7 \times 10^{-3}$.

6. The single-mode optical fiber according to claim 1, wherein said ring has an inner radius ($r_{ring1}$) of between about 24 microns and 35 microns.

7. The single-mode optical fiber according to claim 1, wherein the ratio of said inner radius of said ring to said radius of said central core ($r_{ring1}/a$) is between about 2.5 and 8.

8. The single-mode optical fiber according to claim 1, wherein the ratio of said inner radius of said ring to said radius of said central core ($r_{ring1}/a$) is between about 3.5 and 7.

9. The single-mode optical fiber according to claim 1, wherein said outer depressed cladding has a refractive-index difference ($Dn_{out}$) with said outer optical cladding of between about $-6 \times 10^{-3}$ and $-2 \times 10^{-3}$.

10. The single-mode optical fiber according to claim 1, wherein said outer depressed cladding has a refractive-index difference ($Dn_{inner} - Dn_{out}$) with said inner depressed cladding of between about $-2 \times 10^{-3}$ and $2 \times 10^{-3}$.

11. The single-mode optical fiber according to claim 1, wherein said outer depressed cladding has a volume ($V_{out}$) of between about 17 μm² and 25 μm².

12. The single-mode optical fiber according to claim 1, wherein said central core and/or said ring consists essentially of pure silica.

13. The single-mode optical fiber according to claim 1, wherein the optical fiber has a cable cut-off wavelength ($\lambda_{CC}$) of less than about 1550 nanometers.

14. The single-mode optical fiber according to claim 1, wherein the optical fiber has a cable cut-off wavelength ($\lambda_{CC}$) of 1530 nanometers or less.

15. The single-mode optical fiber according to claim 1, wherein the optical fiber has a cable cut-off wavelength ($\lambda_{CC}$) of 1260 nanometers or less.

16. The single-mode optical fiber according to claim 1, wherein, at a wavelength of 1550 nanometers, the optical fiber has leakage losses of less than about 0.005 dB/km.

17. The single-mode optical fiber according to claim 1, wherein, for a bend radius of 10 millimeters, the optical fiber has macrobending losses of (i) less than about 5 dB/m at a wavelength of 1550 nanometers and (ii) less than about 10 dB/m at a wavelength of 1625 nanometers.

18. A method for manufacturing an optical fiber according to claim 1, comprising the steps of:
depositing layers inside a deposition tube, the layers forming the central core and the inner depressed cladding, and the deposition tube forming the ring;
providing the outer depressed cladding around the ring;
providing the outer optical cladding around the outer depressed cladding to form an optical preform; and
drawing the optical fiber by heating a first end of the optical preform.

19. The method according to claim 18, comprising the step of partially removing the deposition tube.

20. The method according to claim 18, wherein the outer depressed cladding is provided by sleeving with a doped tube and/or by outside deposition with doped silica.

21. A single-mode optical fiber, comprising:
a central core surrounded by an outer optical cladding, said central core having a radius (a) of between about 3.5 microns and 7.5 microns and a refractive-index difference ($Dn_1$) with said outer optical cladding of between about $-0.5 \times 10^{-3}$ and $0.5 \times 10^{-3}$;
an inner depressed cladding positioned between said central core and said outer optical cladding, said inner depressed cladding having an outer radius ($r_{ring1}$) of between about 24 microns and 35 microns and a refractive-index difference ($Dn_{inner}$) with said outer optical cladding of between about $-6 \times 10^{-3}$ and $-2.7 \times 10^{-3}$;
a ring positioned between said inner depressed cladding and said outer optical cladding, said ring having an inner radius ($r_{ring1}$), an outer radius ($r_{ring2}$), a width ($w_{ring}$) of between about 1.8 microns and 3 microns, and a refractive-index difference ($Dn_{ring}$) with said outer optical cladding of between about $-0.5 \times 10^{-3}$ and $0.5 \times 10^{-3}$; and
an outer depressed cladding positioned between said ring and said outer optical cladding, said outer optical cladding having an outer radius ($r_{out}$) of between about 45 microns and 48 microns and a refractive-index difference ($Dn_{out}$) with said outer optical cladding of between about $-6 \times 10^{-3}$ and $-2 \times 10^{-3}$;
wherein said outer optical cladding has an outer radius of between about 61.5 microns and 63.5 microns;
wherein said central core has a volume ($V_{core}$), the ratio of said volume of said central core over said width of said ring ($V_{core}/w_{ring}$) being between about 0.12 micron and 0.2 micron, the volume ($V_{core}$) of said central core being defined as follows:

$$Vcore = 2\pi \left| \int_0^a Dn(r) r \, dr \right|$$

wherein,
$Dn(r) = n_{core}(r) - n_{inner}$;
$n_{core}(r)$ is the refractive index of the central core at the radius r; and
$n_{inner}$ is the average refractive index of the inner depressed cladding;
wherein said outer depressed cladding has a volume of between about 17 μm² and 25 μm², said volume ($V_{out}$) of said outer depressed cladding being defined as follows:

$$Vout = 2\pi \left| \int_{rring2}^{rout} Dn(r) r \, dr \right|$$

wherein,
$Dn(r) = n_{out}(r) - n_{cl}$;
$n_{out}(r)$ is the refractive index of the outer depressed cladding at the radius r; and
$n_{cl}$ is the average refractive index of the outer optical cladding.

22. The single-mode optical fiber according to claim 21, comprising a trench positioned within said inner depressed cladding, said trench having an inner radius (b) of between about 7.5 microns and 12 microns, an outer radius (c) of between about 13 microns and 21 microns, and a refractive-index difference ($Dn_3$) with said outer optical cladding of between about $-16 \times 10^{-3}$ and $-7 \times 10^{-3}$.

23. The single-mode optical fiber according to claim 21, wherein the ratio of said inner radius of said ring to said radius of said central core ($r_{ring1}/a$) is between about 3.5 and 7.

24. The single-mode optical fiber according to claim 21, wherein the optical fiber has a cable cut-off wavelength ($\lambda_{CC}$) of 1530 nanometers or less.

25. The single-mode optical fiber according to claim 21, wherein the optical fiber has a cable cut-off wavelength ($\lambda_{CC}$) of 1260 nanometers or less.

26. The single-mode optical fiber according to claim 21, wherein, at a wavelength of 1550 nanometers, the optical fiber has leakage losses of less than about 0.005 dB/km.

27. The single-mode optical fiber according to claim 21, wherein, for a bend radius of 10 millimeters, the optical fiber has macrobending losses of (i) less than about 5 dB/m at a wavelength of 1550 nanometers and (ii) less than about 10 dB/m at a wavelength of 1625 nanometers.

28. An optical preform, comprising:
a central core surrounded by an outer optical cladding, said central core having a refractive-index difference ($Dn_1$) with said outer optical cladding of between about $-0.5 \times 10^{-3}$ and $0.5 \times 10^{-3}$;
an inner depressed cladding positioned between said central core and said outer optical cladding, said inner depressed cladding having a refractive-index difference ($Dn_{inner}$) with said outer optical cladding of between about $-6 \times 10^{-3}$ and $-2.7 \times 10^{-3}$;
a ring positioned between said inner depressed cladding and said outer optical cladding, said ring having a refractive-index difference ($Dn_{ring}$) with said outer optical cladding of between about $-0.5 \times 10^{-3}$ and $0.5 \times 10^{-3}$; and
an outer depressed cladding positioned between said ring and said outer optical cladding, said outer optical cladding having (i) a refractive-index difference with the inner depressed cladding ($Dn_{inner} - Dn_{out}$) of between about $-2 \times 10^{-3}$ and $2 \times 10^{-3}$ and (ii) a refractive-index difference ($Dn_{out}$) with said outer optical cladding of between about $-6 \times 10^{-3}$ and $-2 \times 10^{-3}$;
wherein the ratio of the cross-sectional area of the central core to the cross-sectional area of the outer optical cladding is between about 0.0047 and 0.044;
wherein the ratio of the cross-sectional area of the inner depressed cladding to the cross-sectional area of the outer optical cladding is between about 0.14 and 0.95;
wherein the ratio of the cross-sectional area of the ring to the cross-sectional area of the outer optical cladding is between about 0.025 and 0.28; and wherein the ratio of the cross-sectional area of the outer depressed cladding to the cross-sectional area of the outer optical cladding is between about 0.30 and 1.56.

29. The optical preform according to claim 28, wherein:

the ratio of the cross-sectional area of the central core to the cross-sectional area of the outer optical cladding is between about 0.0061 and 0.039;

the ratio of the cross-sectional area of the inner depressed cladding to the cross-sectional area of the outer optical cladding is between about 0.25 and 0.83;

the ratio of the cross-sectional area of the ring to the cross-sectional area of the outer optical cladding is between about 0.044 and 0.15; and the ratio of the cross-sectional area of the outer depressed cladding to the cross-sectional area of the outer optical cladding is between about 0.39 and 1.11.

\* \* \* \* \*